United States Patent
Roth et al.

(10) Patent No.: US 11,787,920 B2
(45) Date of Patent: Oct. 17, 2023

(54) FLAME-RETARDANT POLYAMIDES

(71) Applicant: BASF SE, Ludwigshafen (DE)

(72) Inventors: Michael Roth, Ludwigshafen (DE); Christoph Minges, Ludwigshafen (DE); Klaus Uske, Ludwigshafen (DE); Michaela Heussler, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/339,738

(22) PCT Filed: Sep. 28, 2017

(86) PCT No.: PCT/EP2017/074636
§ 371 (c)(1),
(2) Date: Apr. 5, 2019

(87) PCT Pub. No.: WO2018/069055
PCT Pub. Date: Apr. 19, 2018

(65) Prior Publication Data
US 2020/0048434 A1   Feb. 13, 2020

(30) Foreign Application Priority Data
Oct. 13, 2016 (EP) .................................... 16193701

(51) Int. Cl.
| | | |
|---|---|---|
| C08K 13/02 | (2006.01) | |
| C08J 5/18 | (2006.01) | |
| C08K 3/22 | (2006.01) | |
| C08K 3/34 | (2006.01) | |
| C08K 3/36 | (2006.01) | |
| C08K 3/40 | (2006.01) | |
| C08K 5/098 | (2006.01) | |
| C08K 5/20 | (2006.01) | |
| C08K 5/3492 | (2006.01) | |
| C08K 7/14 | (2006.01) | |
| D01F 1/07 | (2006.01) | |
| D01F 6/60 | (2006.01) | |

(52) U.S. Cl.
CPC ............. *C08K 13/02* (2013.01); *C08J 5/18* (2013.01); *C08K 3/22* (2013.01); *C08K 3/346* (2013.01); *C08K 3/36* (2013.01); *C08K 3/40* (2013.01); *C08K 5/098* (2013.01); *C08K 5/20* (2013.01); *C08K 5/34924* (2013.01); *C08K 7/14* (2013.01); *D01F 1/07* (2013.01); *D01F 6/60* (2013.01); *C08J 2377/02* (2013.01); *C08K 2003/2241* (2013.01); *C08K 2003/343* (2013.01); *C08K 2201/006* (2013.01); *D10B 2401/04* (2013.01)

(58) Field of Classification Search
CPC .......... C08K 13/02; C08K 3/22; C08K 3/346; C08K 3/36; C08K 3/40; C08K 5/098; C08K 5/20; C08K 5/34924; C08K 7/14; C08J 5/18; D01F 1/07; D01F 6/60
See application file for complete search history.

(56) References Cited

U.S. PATENT DOCUMENTS

| | | | |
|---|---|---|---|
| 3,660,344 A | | 5/1972 | Dietrich et al. |
| 4,789,698 A | | 12/1988 | Bonten et al. |
| 5,482,985 A | * | 1/1996 | Baierweck ............... C08K 3/22 |
| | | | 524/101 |
| 6,184,282 B1 | | 2/2001 | Gareiss et al. |
| 6,500,881 B1 | | 12/2002 | Galli et al. |
| 7,482,420 B2 | | 1/2009 | Porsch et al. |
| 2004/0192812 A1 | | 9/2004 | Engelmann et al. |
| 2007/0072967 A1 | | 3/2007 | Nass et al. |
| 2013/0338264 A1 | * | 12/2013 | Weiss .................. C08K 5/5317 |
| | | | 523/451 |
| 2016/0122511 A1 | | 5/2016 | Bienmueller et al. |

FOREIGN PATENT DOCUMENTS

| | | | | |
|---|---|---|---|---|
| CA | 2788267 A1 | * | 9/2011 | ......... C08G 73/0644 |
| CN | 102791798 A | | 11/2012 | |
| CN | 103013110 A | | 4/2013 | |
| CN | 103214825 A | | 7/2013 | |
| DE | 1694254 A1 | | 6/1971 | |
| DE | 69912241 T2 | | 4/2004 | |
| DE | 102015209451 A1 | | 12/2015 | |
| EP | 241702 A1 | | 10/1987 | |
| EP | 848729 A1 | | 6/1998 | |
| EP | 1423460 A1 | | 6/2004 | |
| EP | 1762592 A1 | | 3/2007 | |

(Continued)

OTHER PUBLICATIONS

Hoffman Mineral Functional Fillers for Coatings. Jul. 9, 2010. (Year: 2010).*
Dorey et al., On the impact performance of carbon fibre laminates with epoxy and PEEK matrices, Composites Science and Technology, 23:221-37 (1985).
International Application No. PCT/EP2017/074636, International Search Report, dated Nov. 9, 2017.
"Hoffman Mineral offers new filler" Focus on Powder Coatings, vol. 2011, Issue 6, p. 5 (Jun. 2011).

(Continued)

*Primary Examiner* — John E Uselding
(74) *Attorney, Agent, or Firm* — MARSHALL, GERSTEIN & BORUN LLP

(57) ABSTRACT

Thermoplastic molding compositions containing
A) from 30 to 97% by weight of at least one polyamide,
B) from 1 to 20% by weight of a melamine compound,
C) from 1 to 50% by weight of a mineral filler composed of a mixture of (crypto)crystalline silica (C1) and amorphous silica (C2) and of calcined kaolin (C3),
D) from 0 to 20% by weight of a fibrous filler,
E) from 0 to 25% by weight of talc powder,
F) from 0 to 15% by weight of other additives,
where the total of the percentages by weight of A) to F) is 100%.

7 Claims, No Drawings

(56) References Cited

FOREIGN PATENT DOCUMENTS

WO    WO-2004/014993 A2    2/2004

OTHER PUBLICATIONS

Functional Fillers: Elastomers and TPE, Thermoplastic Molded Parts and Films Brochure, Hoffmann Mineral GMBH, Germany, 40 pp., (2015).
Heckl et al., Better Filling of Polyamides, Kunststoffe International, Munich, Germany, 4 pp. (Feb. 2011).
Zehnder et al., Calcined neuburg siliceous earth in thermoplastics: Polyamide 6 and 66, Hoffmann Mineral GMBH (2014).

* cited by examiner

FLAME-RETARDANT POLYAMIDES

CROSS-REFERENCE TO RELATED APPLICATIONS

This is a U.S. national phase of International Application No. PCT/EP2017/074636, filed Sep. 28, 2017, which claims the benefit of European Patent Application No. 16193701.6 filed Oct. 13, 2016.

The invention relates to thermoplastic molding compositions comprising
- A) from 30 to 97% by weight of at least one polyamide,
- B) from 1 to 20% by weight of a melamine compound,
- C) from 1 to 50% by weight of a mineral filler composed of a mixture of in essence (crypto)crystalline silica (C1) and amorphous silica (C2) and of calcined kaolin (C3),
- D) from 0 to 20% by weight of a fibrous filler,
- E) from 0 to 25% by weight of talc powder,
- F) from 0 to 15% by weight of other additives, where the total of the percentages by weight of A) to F) is 100%.

The invention further relates to use for the production of moldings of any type and to moldings obtained from the molding compositions of the invention.

Use of melamine derivatives (melamine cyanurate) as flame retardants for polyamides has been known for many years (see U.S. Pat. No. 3,660,344).

The last few years have seen an accelerated increase in the importance of flame-retardant polyamides. Products of particular interest here are those with pale intrinsic color for the electrical sector. However, although red phosphorus and halogen compounds in combination with synergists are known flame-retardancy systems, they are unsuitable for this application sector. Halogen compounds reduce the level of electrical properties such as tracking resistance and dielectric strength. The intrinsic color of red phosphorus prevents its use for pale colors. DE-A 1694254 recommends use of melamine for the production of pale-color, unreinforced, flame-retardant polyamides. In the case of glassfiber-reinforced polyamides, melamine and melamine salts, for example melamine cyanurate, are less effective, and the glow-wire resistance of these products is very low—specifically when wall thicknesses are low.

In contrast, unreinforced molding compositions, which generally have higher glow-wire resistance, have the disadvantage of inadequate mechanical properties such as stiffness and strength. Although addition of glass fibers to polyamide mixtures with melamine cyanurate improves mechanical properties, flame retardancy properties are adversely affected because flame retardancy is drastically impaired by what is known as the wicking effect of glass fibers.

Accordingly, EP-A 241 702 and EP-A 848 729 disclose that the flame retardancy performance of PA mixtures made of glass fibers with melamine cyanurate can be improved by using short glass fibers in the mixture. Flame retardancy here can likewise be improved by adopting particular particle sizes of the melamine cyanurate used (see EP-A 1423 460).

The effectiveness of flame retardancy additive mixtures is in essence described via UL 94 V fire tests. However, for certain applications of flame-retardant polymers in systems within buildings, and also in low-voltage switching equipment, the glow-wire test in accordance with IEC 60695-2-12 is an especially significant criterion, while high flame retardancy is also desirable.

When glass fibers are used in the patents cited, they can be used in the form of conventional continuous-filament fibers (rovings) or of chopped fibers (fiber bundles of length from 4 to 6 mm). Shear in the extruder then gives a glassfiber-length distribution range in the product that is about 250-300 µm in the case of conventional processing (based on a product with 25% glassfiber content). A factor requiring consideration here is that average fiber length generally decreases as fiber content increases, because the extent of fiber interactions in the incorporation zone increases and the extent of fiber breakage therefore increases (F. Raumsteiner, R. Theysohn, Comp. Sci. Techn. 23 (1985) 231).

It was therefore an object of the present invention to provide flame-retardant thermoplastic molding compositions which have good mechanical properties and good flame retardancy. A particular intention was that flame retardancy resulting in minimization of afterflame times in the glow-wire test be obtainable via addition of mineral fillers.

Surprisingly, a particularly suitable material is a naturally occurring mineral filler which consists of a mixture of corpuscular, (crypto)crystalline and amorphous silica with calcined lamellar kaolin (Neuburg siliceous earth). The mineral mixture takes the form of an unconsolidated, crystalline geological deposit which is not amenable to separation by physical methods.

The silica fraction has a round granular shape and consists of aggregated cryptocrystalline primary particles of size about 200 nm with an opal-like coating of amorphous silica. This structure results in the relatively high specific surface area and oil absorption value.

The molding compositions defined in the introduction have accordingly been found. Preferred embodiments are provided in the dependent claims.

The individual components of the thermoplastic molding compositions of the invention are described below.

Component (A)

The molding compositions of the invention comprise, as component A), from 30 to 97% by weight, preferably from 40 to 92% by weight and in particular from 40 to 80% by weight, of at least one polyamide, preference being given here to semicrystalline polyamides.

The intrinsic viscosity of the polyamides of the molding compositions of the invention is generally from 79.9 to 350 ml/g, preferably from 110 to 240 ml/g, determined in 0.5% by weight solution in 96% by weight sulfuric acid at 25° C. in accordance with ISO 307.

Preference is given to semicrystalline or amorphous resins with molar mass Mw (weight average) at least 5000 of the type described by way of example in the U.S. Pat. Nos. 2,071,250, 2,071,251, 2,130,523, 2,130,948, 2,241,322, 2,312,966, 2,512,606 and 3,393,210.

Examples here are polyamides which derive from lactams having from 7 to 13 ring members, for example polycaprolactam, polycaprylolactam and polylaurolactam, and also polyamides which are obtained via reaction of dicarboxylic acids with diamines.

Dicarboxylic acids that can be used are alkanedicarboxylic acids having from 6 to 12 carbon atoms, in particular from 6 to 10 carbon atoms, and aromatic dicarboxylic acids. Mention may be made here of just a few acids: adipic acid, azelaic acid, sebacic acid, dodecanedioic acid and terephthalic and/or isophthalic acid.

Particularly suitable diamines are alkanediamines having from 6 to 12 carbon atoms, in particular from 6 to 8 carbon atoms, and also m-xylylenediamine (e.g. Ultramid® X17 from BASF SE, with a molar ratio of MXDA to adipic acid of 1:1), di(4-aminophenyl)methane, di(4-aminocyclohexyl)

methane, 2,2-di(4-aminophenyl)propane, 2,2-di(4-aminocyclohexyl)propane or 1,5-diamino-2-methylpentane.

Preferred polyamides are polyhexamethyleneadipamide, polyhexamethylenesebacamide and polycaprolactam, and also 6/66 copolyamides, in particular having from 5 to 95% by weight content of caprolactam units (for example Ultramid® C31 from BASF SE).

The preferred semiaromatic copolyamides with low triamine content can be produced by the processes described in EP-A 129 195 and 129 196.

The following nonexhaustive list contains the polyamides mentioned and also other polyamides A) within the meaning of the invention, and the monomers comprised.

| AB polymers: | |
|---|---|
| PA 4 | pyrrolidone |
| PA 6 | ε-caprolactam |
| PA 7 | enantholactam |
| PA 8 | caprylolactam |
| PA 9 | 9-aminopelargonic acid |
| PA 11 | 11-aminoundecanoic acid |
| PA 12 | laurolactam |
| AA/BB polymers | |
| PA 46 | tetramethylenediamine, adipic acid |
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 1212 | 1,12-dodecanediamine, decanedicarboxylic acid |
| PA 1313 | 1,13-diaminotridecane, undecanedicarboxylic acid |
| PA 6T | hexamethylenediamine, terephthalic acid |
| PA 9T | 1,9-nonanediamine, terephthalic acid |
| PA MXD6 | m-xylylenediamine, adipic acid |
| PA 6I | hexamethylenediamine, isophthalic acid |
| PA 6-3-T | trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | diaminodicyclohexylmethane, laurolactam, |
| PA 6I/6T/PACM | as PA 6I/6T + diaminodicyclohexylmethane |
| PA 12/MACMI | laurolactam, dimethyldiaminodicyclohexylmethane, isophthalic acid |
| PA 12/MACMT | laurolactam, dimethyldiaminodicyclohexylmethane, terephthalic acid |
| PA PDA-T | phenylenediamine, terephthalic acid |

Polyamides that are further suitable are obtainable from w-aminoalkyl nitriles, for example aminocapronitrile (PA 6) and adiponitrile with hexamethylenediamine (PA 66) by what is known as direct polymerization in the presence of water, as described by way of example in DE-A 10313681, EP-A 1198491 and EP 922065.

Mention may moreover also be made of polyamides which are obtainable by way of example via condensation of 1,4-diaminobutane with adipic acid at elevated temperature (polyamide 4,6). Production processes for polyamides of this structure are described by way of example in EP-A 38 094, EP-A 38 582 and EP-A 39 524.

Polyamides further suitable are those obtainable by copolymerization of two or more of the abovementioned monomers, and mixtures of a plurality of polyamides in any desired mixing ratio. Particular preference is given to mixtures of polyamide 66 with other polyamides, in particular 6/66 copolyamides.

Materials that have moreover proven to be particularly advantageous are semiaromatic copolyamides such as PA 6/6T and PA 66/6T, the triamine content of which is less than 0.5% by weight, preferably less than 0.3% by weight (see EP-A 299 444). Other polyamides with high temperature resistance are disclosed in EP-A 19 94 075 (PA 6T/6I/MXD6). These polyamides are in particular used in quantities of up to 20% by weight, preferably up to 10% by weight, based on 100% of A), with semicrystalline polyamides.

It is, of course, also possible to use mixtures of these polyamides in any desired mixing ratio.

The molding compositions of the invention comprise, as component B), from 1 to 20% by weight, preferably from 2 to 15% by weight and in particular from 2 to 13% by weight, of a melamine compound.

The melamine cyanurate that is particularly suitable in the invention (component B) is a reaction product of preferably equimolar quantities of melamine (formula I) and cyanuric acid/isocyanuric acid (formulae Ia and Ib)

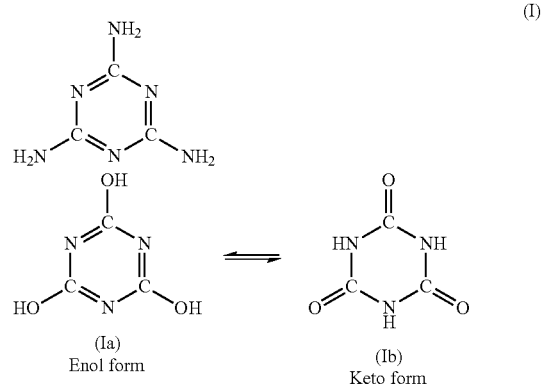

It is obtained by way of example via reaction of aqueous solutions of the starting compounds at from 90 to 100° C. The product obtainable commercially is a white powder with average grain size $d_{50}$ from 1.5 to 7 μm and with $d_{99}$ value below 50 μm.

Other suitable compounds (also often termed salts or adducts) are melamine sulfate, melamine, melamine borate, melamine oxalate, melamine phosphate prim., melamine phosphate sec. and melamine pyrophosphate sec., melamine neopentyl glycol borate, and also polymeric melamine phosphate (CAS No. 56386-64-2/218768-84-4).

It is very particularly preferable within the invention to use melamine cyanurate with the following particle size distribution:

$d_{98}$<25 μm, preferably <20 μm
$d_{50}$<4.5 μm, preferably <3 μm.

The person skilled in the art generally understands a $d_{50}$ value to be the particle size value which is smaller than that of 50% of the particles and larger than that of 50% of the particles.

The particle size distribution is usually determined by laser scattering (by a method based on ISO 13320).

The molding compositions of the invention comprise, as component C), from 1 to 50% by weight, preferably from 5 to 45% by weight and in particular from 10 to 40% by weight, of a mineral filler composed of a mixture of in essence (crypto)crystalline silica (C1) and amorphous silica (C2) and of calcined kaolin (C3).

Surprisingly, a particularly suitable material is a naturally occurring mineral filler which consists of a mixture of corpuscular, (crypto)crystalline and amorphous silica with calcined lamellar kaolin (Neuburg siliceous earth). The mineral mixture takes the form of an unconsolidated, crystalline geological deposit which is not amenable to separation by physical methods but is amenable to determination by X-ray-diffraction analysis.

The silica fraction has a round granular shape and consists of aggregated cryptocrystalline primary particles of size about 200 nm with an opal-like coating of amorphous silica. The kaolin fraction in this mineral filler is calcined by subsequent thermal treatment, and this mixture is obtainable commercially.

A preferred mineral filler C) comprises a mixture of, based on 100% of C), from 45 to 70% by weight of C1, preferably from 53 to 65% by weight C1, with from 5 to 15% by weight of C2, preferably from 7 to 12% by weight of C2, and from 20 to 40% by weight of C3, preferably from 25 to 35% by weight of C3.

It is preferable that (in contrast to most kaolins) the Al content of component C), based on 100% of C), is less than 15%, preferably from 2 to 10% by weight and in particular from 3 to 8% by weight.

The Si content of component C), based on 100% of C), is in particular greater than 30% by weight, preferably from 35 to 50% by weight and in particular from 38 to 45% by weight.

Both the Si content and the Al content can be determined by XFA (X-ray fluorescence analysis) in accordance with DIN 51001.

The BET specific surface area of preferred component C) in accordance with DIN ISO 9277 is from 5 to 15 $m^2/g$, preferably from 6 to 10 $m^2/g$.

The oil absorption number of preferred components C) in accordance with DIN ISO 787 Part 5 is from 50 to 60 g/100 g, preferably from 52 to 58 g/100 g.

The mineral filler C) can have been surface-pretreated in order to improve compatibility with the polymer matrix. For detailed information, see component D).

The following may be mentioned as fibrous fillers D): carbon fibers, glass fibers, glass beads, amorphous silica, calcium silicate, calcium metasilicate, magnesium carbonate, kaolin, chalk, quartz powder, mica, barium sulfate and feldspar, quantities of these used being from 0 to 20% by weight, preferably from 0.5 to 20% by weight, in particular from 5 to 20% by weight.

The following may be mentioned as preferred fibrous fillers: carbon fibers, aramid fibers and potassium titanate fibers, but particular preference is given here to glassfibers in the form of E glass. These can be used in the form of rovings or of chopped glass in the forms available commercially.

The fibrous fillers can have been surface-pretreated with a silane compound in order to improve compatibility with the thermoplastics.

Suitable silane compounds are those of the general formula

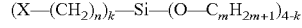

where the definitions of the substituents are as follows:

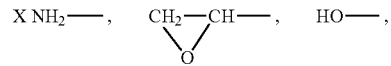

n is an integer from 2 to 10, preferably from 3 to 4
m is an integer from 1 to 5, preferably from 1 to 2
k is an integer from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The quantities generally used of the silane compounds for surface-coating are from 0.01 to 2% by weight, preferably from 0.025 to 1.0% by weight and in particular from 0.05 to 0.5% by weight (based on D).

Acicular mineral fillers are also suitable.

For the purposes of the invention, the expression acicular mineral fillers means a mineral filler with distinctly acicular character. An example that may be mentioned is acicular wollastonite. The L/D (length to diameter) ratio of the mineral is preferably from 8:1 to 35:1, preferably from 8:1 to 11:1. The mineral filler can optionally have been pretreated with the abovementioned silane compounds; however, the pretreatment is not essential.

The polyamide molding compositions of the invention can comprise a fibrous filler with arithmetic average fiber length from 70 to 200 μm, preferably from 80 to 180 μm and in particular from 100 to 150 μm. Average diameter is generally from 3 to 30 μm or mm, preferably from 8 to 20 μm or mm and in particular from 10 to 14 μm or mm.

The desired fiber length can be established by way of example via grinding in a ball mill to give a fiber length distribution.

The result of fiber length reduction, when average fiber length is <200 μm, is a free-flowable material which can be incorporated by mixing in the manner of a powder into the polymer.

Because the fibers are short, only slight further shortening of the fiber occurs during incorporation.

Fiber content is usually determined after ashing of the polymer. The fiber length distribution is generally determined by taking up the ash residue in silicone oil and photography with 20× microscope magnification. The length of at least 500 fibers can be measured on the images, and the (arithmetic) average value ($d_{50}$) can be calculated therefrom.

The $d_{50}$ value is preferably smaller than or equal to 180 µm, with preference smaller than or equal to 160 µm and in particular smaller than or equal to 150 µm. Simultaneously with determination of the $d_{50}$ value it is also possible to determine the $d_{10}$ and $d_{90}$ values of the glassfiber layer distribution. The meaning of the $d_{10}$ value here is that 10% of the glass fibers in the sample have a length x. The following values have proven advantageous for the present molding compositions of the invention: $d_{10}$ values smaller than or equal to 60 µm, preferably smaller than or equal to 55 µm, and $d_{90}$ values smaller than or equal to 350 µm, preferably smaller than or equal to 290 µm.

The molding compositions of the invention comprise, as component E), from 0 to 25% by weight of talc powder. If this is used concomitantly, the quantities used thereof are preferably from 5 to 20% by weight, in particular from 10 to 20% by weight.

Talc is a hydrated magnesium silicate of the formula $Mg_3[(OH)_2/Si_4O_{10}]$ or $3MgOx4SiO_2xH_2O$. These materials known as three-layer phyllosilicates belong to the triclinic, monoclinic or rhombic crystal system, with lamellar habit. The following other trace elements can be present: Mn, Ti, Cr, Ni, Na and K, and the OH group here can have been replaced by fluoride.

It is particularly preferable to use talc powder in which 100% of the particle sizes are smaller than 20 µm. The particle size distribution is usually determined by sedimentation analysis, and is preferably the following: <20 µm: 100% by weight, <10 µm: 99% by weight, <5 µm: 85% by weight, <3 µm: 60% by weight, <2 µm: 43% by weight. Products of this type are obtainable commercially as Micro-Talc I.T. extra.

Component (F)

The thermoplastic molding compositions of the invention can comprise, as component F), from 0 to 2% by weight, preferably from 0.01 to 2% by weight, preferably from 0.05 to 1.5% by weight, particularly preferably from 0.1 to 1.5% by weight, of at least one heat stabilizer.

The heat stabilizers in a preferred embodiment are selected from the group consisting of compounds of mono- or divalent copper, for example salts of mono- or divalent copper with inorganic or organic acids or with mono- or dihydric phenols, the oxides of mono- or divalent copper, and the complexes of copper salts with ammonia, with amines, with amides, with lactams, with cyanides or with phosphines, preferably the Cu(I) or Cu(II) salts of hydrohalic acids or of hydrocyanic acids, or the copper salts of aliphatic carboxylic acids. Particular preference is given to the monovalent copper compounds CuCl, CuBr, CuI, CuCN and $Cu_2O$, and also the divalent copper compounds $CuCl_2$, $CuSO_4$, CuO, copper(II) acetate or copper(II) stearate. To the extent that a copper compound is used, the quantity of copper is preferably, based on the entirety of components A) to F), from 0.005 to 0.5% by weight, in particular from 0.005 to 0.3% by weight and particularly preferably from 0.01 to 0.2% by weight.

The copper compounds are available commercially, or production thereof is known to the person skilled in the art. The copper compound can be used per se or in the form of concentrates. The term concentrate here means a polymer, preferably of the same chemical type as component A), which comprises a high concentration of the copper salt. Use of the concentrates is a conventional method and is particularly frequently used when metering of very small quantities of an input material is required. The copper compounds are advantageously used in combination with other metal halides, in particular alkali metal halides, for example NaI, KI, NaBr, KBr, where the molar ratio of metal halide to copper is from 0.5 to 20, preferably from 1 to 10 and particularly preferably from 2 to 5, stabilizers based on secondary aromatic amines, where the quantity present of these stabilizers is preferably from 0.2 to 2% by weight, with preference from 0.5 to 1.5% by weight, stabilizers based on sterically hindered phenols, where the quantity present of these stabilizers is preferably from 0.05 to 1.5% by weight, with preference from 0.1 to 1% by weight, and mixtures of the abovementioned stabilizers.

Particularly preferred examples of stabilizers which can be used in the invention and are based on secondary aromatic amines are adducts derived from phenylenediamine with acetone (Naugard A), adducts derived from phenylenediamine with linolene, Naugard 445 (II), N,N'-binaphthyl-p-phenylenediamine (III), N-phenyl-N'-cyclohexyl-p-phenylenediamine (IV) and mixtures of two or more thereof.

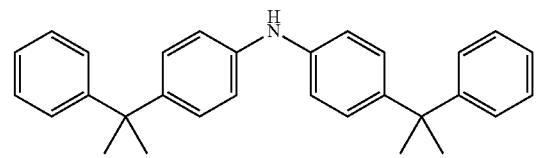

(II)

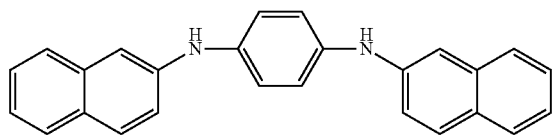

(III)

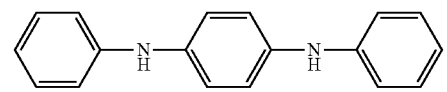

(IV)

Preferred examples of stabilizers which can be used in the invention and are based on sterically hindered phenols are N,N'-hexamethylenebis-3-(3,5-di-tert-butyl-4-hydroxyphenyl)propionamide (V), glycol bis(3,3-bis(4'-hydroxy-3'-tert-butylphenyl)butanoate) (VI), 2,1'-thioethyl bis(3-(3,5-di-tert-butyl-4-hydroxyphenyl)propionate (VII), 4-4'-butylidenebis(3-methyl-6-tert-butylphenol) (VIII), triethylene glycol 3-(3-tert-butyl-4-hydroxy-5-methylphenyl)propionate (IX) and mixtures of two or more thereof.

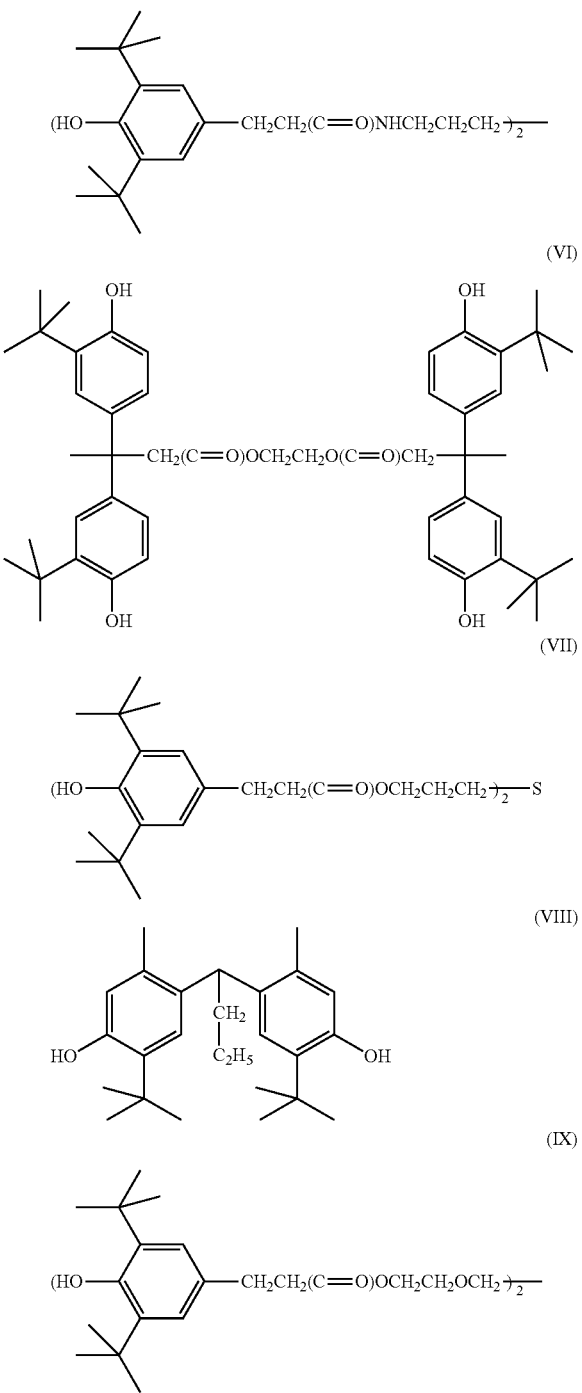

The thermoplastic molding compositions of the invention can comprise from 0 to 1.5% by weight, preferably from 0.05 to 1.5% by weight, particularly preferably from 0.1 to 1% by weight, of a mold-release agent.

Mold-release agents are added to the molding composition in order to facilitate the demolding of the resultant product, i.e. the release of the molding from the mold.

The mold-release agents in a preferred embodiment are selected from the group consisting of fatty acids and the alkali metal or alkaline earth metal or zinc salts of these, and diamides derived from alkylenediamine and fatty acids. It is particularly preferable to use mold-release agents selected from the group consisting of calcium montanate, stearic acid, behenic acid, stearyl alcohol, alkyl stearates and stearamides, and also esters of pentaerythritol with long-chain fatty acids, examples being stearin, Ca stearate and Zn stearate.

The thermoplastic molding compositions of the invention can comprise from 0 to 40% by weight, preferably from 0 to 30% by weight, of other additives F).

These other additives used can be any of the additives known to the person skilled in the art for thermoplastic molding compositions comprising polyamides or copolyamides. They are preferably selected from the group consisting of pigments, impact modifier, nucleating agent and mixtures thereof.

The pigments used for the coloring of thermoplastics are well known, see by way of example R. Gächter and H. Müller, Taschenbuch der Kunststoffadditive [Plastics additives handbook], Carl Hanser-Verlag, 1983, pp. 494-510.

White pigments may be mentioned as first preferred group of pigments, examples being zinc oxide, white lead (2 $PbCO_3Pb(OH)_2$), lithopones, antimony white and titanium dioxide. Of the two most familiar crystalline forms of titanium dioxide (rutile and anatase), it is in particular the rutile form that is used for white coloring of the molding compositions of the invention.

Black pigments which can be used in the invention are iron oxide black ($Fe_3O_4$), spinel black ($Cu(Cr,Fe)_2O_4$), manganese black (a mixture of manganese dioxide, silicon dioxide and iron oxide), cobalt black and antimony black, and also particularly preferably carbon black, which is mostly used in the form of furnace black or gas black.

It is, of course, also possible in the invention to use the following in order to establish particular hues: inorganic chromatic pigments such as chromium oxide green or organic chromatic pigments such as azo pigments and phthalocyanines. These pigments are widely commercially available.

It can moreover be advantageous to use the pigments or dyes mentioned in mixtures, an example being carbon black with copper phthalocyanines, since this generally facilitates dispersion of color in the thermoplastic.

Black coloring can be achieved not only by use of pigments but also by use of nigrosin.

The thermoplastic molding compositions of the invention can be produced by known processes, by mixing, and then extruding, the starting components A) to C), and also optionally D) to F) in conventional mixing devices. Suitable processing machines are described in Handbuch der Kunststoffextrusion [Plastics extrusion handbook], vol. 1, Grundlagen [Basic principles], ed. F. Hensen, W. Knappe, H. Potente, 1989, pp. 3-7, ISBN:3-446-14339-4 (vol. 2, Extrusionsanlagen [Extrusion systems], 1986, ISBN 3-446-14329-7). The extrudate can be cooled and comminuted. It is also possible to premix individual components and then to add the remaining starting materials individually and/or likewise in a mixture—or else as concentrate in a carrier polymer (masterbatch). The mixing temperatures are generally from 230 to 320° C.

The thermoplastic molding compositions of the invention feature good mechanical properties and HDT and a good, and highly reproducible, flame retardancy classification in accordance with UL 94, and also very good glow-wire resistance (low afterflame times).

These materials are suitable for the production of fibers, films and moldings of any type. Some examples are: plug connectors, plugs, plug parts, cable harness components, circuit mounts, circuit mount components, three-dimensionally injection-molded circuit mounts, electrical connection elements and mechatronic components.

The moldings or semifinished products to be produced in the invention from the thermoplastic molding compositions can be used by way of example in motor vehicle, electrical, electronics, telecommunications or information technology, consumer entertainment or the computer industry, in vehicles and other conveyances, in ships, in spacecraft, in household applications, in office equipment, in sports, in medicine, and also generally in articles and parts of buildings which require increased fire protection.

Improved-flow polyamides can be used in the kitchen and household sector for the production of components for kitchen equipment such as fryers, smoothing irons, and control knobs; they can also be used in the garden and leisure sector.

EXAMPLES

The Following Components were Used:
Component A:
Polyamide 6 with intrinsic viscosity IV 125 ml/g, measured in 0.5% by weight solution in 96% by weight sulfuric acid at 25° C. in accordance with ISO 307 (Ultramid® B24 from BASF SE).
Component B:
Melamine cyanurate with average particle size $d_{50}$~2.6 μm (Melapur® MC25 from BASF SE).
Component C/1a:
Calcined mineral filler consisting, according to X-ray diffraction analysis using Rietveld evaluation, of a mixture of amorphous silica (10% by weight) and crystalline silica (60% by weight) and of calcined lamellar kaolin (30% by weight). (SILFIT® Z91 from Hoffmann Mineral)
Specification and Test Methods:
BET specific surface area: 8 m²/g (DIN ISO 9277),
Oil absorption value: 55 g/100 g (DIN ISO 787 Part 5),
Si content: 42%
Al content: 4.8%
Component C/1b:
Calcined mineral filler consisting, according to X-ray diffraction analysis using Rietveld evaluation, of a mixture of amorphous silica (10% by weight) and crystalline silica (60% by weight) and of calcined lamellar kaolin (30% by weight). Surface sizing aminosilane (AKTIFIT® AM from Hoffmann Mineral)
Specification and Test Methods:
BET specific surface area: 7 m²/g (DIN ISO 9277),
Oil absorption value: 55 g/100 g (DIN ISO 787 Part 5),
Si content: 41%
Al content: 5.6%

Component C/1c:
Commercially available talc powder (grade HP 325 from Pechel GmbH) with from 60 to 62% by weight silicon dioxide content and from 30 to 32% by weight magnesium oxide content, and average particle size $d_{50}$ from 10 to 14 μm.
Component D/1:
Standard chopped glass fiber for polyamides, L=4.0 mm, D=10 μm
Component D/2:
Short glass fiber, average length $(d_{50})$~210 μm, D=10 μm
Components F: all of the formulations used the following as other additives: 0.3% by weight of 3,3'-bis(3,5-di-tert-butyl-4-hydroxyphenyl)-N,N'-hexamethylenedipropionamide (CAS No. 23128-74-7), 0.3% by weight of aluminum stearate (CAS No. 300-92-5), and 2.5% by weight of titanium dioxide (CAS No. 13463-67-7).
Production of Molding Compositions
The glow-wire resistance improvements described in the invention were demonstrated by compounding appropriate polyamide molding compositions. For this, the individual components were mixed in a ZSK 26 (Berstorff) twin-screw extruder at throughput 20 kg/h with a flat temperature profile at about 250-270° C., discharged in the form of strand, cooled until pelletizable and pelletized.
Tests
The test samples for the tests listed in table 1 were injection-molded in an Arburg 420C injection-molding machine at melt temperature about 250-290° C. and mold temperature about 80° C.

The flame retardancy of the molding compositions was determined firstly by the UL 94 V method (Underwriters Laboratories Inc. Standard of Safety, "Test for Flammability of Plastic Materials for Parts in Devices and Appliances", pp. 14-18, Northbrook 1998).

Glow-wire resistance was determined by the GWFI (glow wire flammability index) in accordance with 60695-2-12. The GWFI test, carried out on 3 test samples (for example plaques measuring 60×60×1.0 mm or discs), used a glowing wire at temperatures of from 550 to 960° C. to determine the maximal temperature leading to no ignition during a time including the period of exposure to the glow-wire in 3 successive tests. The test sample was pressed by a force of 1 newton for a period of 30 seconds against a heated glow-wire. The penetration depth of the glow-wire was restricted to 7 mm. The test is considered passed if the afterflame time of the test sample after removal of the glow-wire is less than 30 seconds and if tissue paper placed under the test sample does not ignite.

The proportions of components A) to F) in table 1 give a total of 100% by weight. The table shows the constitutions of the molding compositions and the results of the tests.

TABLE 1

| Test method | Component | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| A | 63.9 | 70.9 | 68.9 | 66.9 | 65.9 | 62.9 | 60.9 | 58.9 | 55.9 | 63.9 | 63.9 | 60.9 | 60.9 | 60.9 |
| B | 8 | 6 | 8 | 10 | 6 | 4 | 6 | 8 | 6 | 8 | 8 | 6 | 6 | 6 |
| C/1a | 25 | | | | | | | | | | | | | |
| C/1b | | 20 | 20 | 20 | 25 | 30 | 30 | 30 | 35 | 20 | 20 | 25 | 20 | 15 |
| C/1c | | | | | | | | | | | | 5 | 10 | 15 |
| D/1 | | | | | | | | | | | 5 | | | |
| D/2 | | | | | | | | | | 5 | | | | |
| F | 3.1 | 3.1 | 3.1 | 3.1 | 3.1 | 3.1 | 3.1 | 3.1 | 3.1 | 3.1 | 3.1 | 3.1 | 3.1 | 3.1 |

TABLE 1-continued

| Test method | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Tensile modulus of elasticity/MPa (ISO 527) | 5122 | 4585 | 4547 | 4640 | 4943 | 5224 | 5335 | 5550 | 5828 | 5217 | 5644 | 5360 | 5727 | 5936 |
| Yield stress/MPa (ISO 527) | 77 | 82 | 82 | 81 | 80 | 82 | 81 | 80 | 82 | 81 | 87 | 77 | 76 | 74 |
| Tensile strain at break/% (ISO 527) | 2.4 | 3.2 | 3.2 | 3.1 | 3.0 | 3.0 | 2.8 | 2.6 | 2.7 | 2.8 | 2.7 | 2.8 | 2.5 | 2.4 |
| Impact resistance/kJ/m² (ISO 179/1eU) | 38 | 96 | 64 | 53 | 69 | 72 | 62 | 50 | 55 | 41 | 33 | 47 | 37 | 36 |
| Notched impact resistance/kJ/m² (ISO 179/1eA) | 2.0 | | | | 3.4 | 3.4 | 3.2 | 2.8 | 3.1 | 3.3 | 2.0 | | | |
| MVR 275° C./5 kg (ISO 1133) | 186 | 230 | 215 | 206 | 207 | 193 | 179 | 155 | 134 | 184 | 173 | 186 | 183 | 186 |
| HDT/A/° C. DIN EN ISO 75 | 83 | | | | 77 | 81 | 83 | 89 | 93 | 87 | 140 | 93 | 93 | 97 |
| CTI/V (DIN EN 60112) | | 575 | 550 | 550 | | | | | | | | | | |
| UL 94 V test (0.8 mm) | V-2 | V-2 | V-2 | V-2 | V-2 | V-2 | V-2 | V-2 | V-2 | V-2 | V-2 | V-2 | V-2 | V-2 |
| GWFI 960° C./0.5 mm | | passed | passed | passed | | | | | | | | | | |
| GWFI 960° C./0.75 mm | passed | passed | passed | passed | passed | passed | passed | passed | passed | passed | passed | | | |
| GWFI 960° C./1.0 mm | passed | passed | passed | passed | passed | passed | passed | passed | passed | passed | passed | passed | passed | passed |
| GWFI 960° C./1.5 mm | passed | passed | passed | passed | passed | passed | passed | passed | passed | passed | passed | passed | passed | passed |

From the data in table 1 it is apparent that the compositions of the invention exhibit very good values not only in respect of flame retardancy and glow-wire resistance (UL 94 V-2 and GWFI 960° C. at 1.0 mm) but also in relation to mechanical properties.

The invention claimed is:

1. A thermoplastic molding composition comprising
   A) from 40 to 80% by weight of at least one polyamide,
   B) from 2 to 13% by weight of a melamine compound comprising melamine cyanurate,
   C) from 10 to 40% by weight of a mineral filler comprising a mixture of (crypto)crystalline silica (C1) and amorphous silica (C2) and of calcined kaolin (C3),
   D) from 0 to 20% by weight of a fibrous filler,
   E) from 0 to 25% by weight of talc powder,
   F) from 0.1 to 1.5% by weight of at least one heat stabilizer selected from the group consisting of compounds of mono- and divalent copper, stabilizers based on secondary aromatic amines, stabilizers based on sterically hindered phenols, and mixtures of these and 0 to 15% by weight of other additives,
   comprising as mineral filler C) a mixture of from 53 to 65% by weight of C1 with from 7 to 12% by weight of C2 and from 25 to 35% by weight of C3, based on 100% of C,
   in which component C) has 3 to 8% by weight Al content and 38 to 45% by weight Si content, based on 100% of C) and where the total of the percentages by weight of A) to F) is 100%.

2. The thermoplastic molding composition according to claim 1, comprising
   D) from 0.5 to 20% by weight.

3. The thermoplastic molding composition according to claim 1, where the BET specific surface area of component C) in accordance with DIN ISO 9277 is from 5 to 15 m²/g.

4. The thermoplastic molding composition according to claim 3, where the oil absorption value of component C) in accordance with DIN ISO 787 Part 5 is from 50 to 60 g/100 g.

5. The thermoplastic molding composition according to claim 1 for use in the production of fibers, films, or moldings.

6. A molding of any type obtained from the thermoplastic molding composition according to claim 1.

7. A thermoplastic molding composition consisting of
   A) from 40 to 80% by weight of at least one polyamide,
   B) from 2 to 13% by weight of a melamine compound comprising melamine cyanurate,
   C) from 10 to 40% by weight of a mineral filler comprising a mixture of (crypto)crystalline silica (C1) and amorphous silica (C2) and of calcined kaolin (C3),
   D) from 0 to 20% by weight of a fibrous filler,
   E) from 0 to 25% by weight of talc powder,
   F) from 0.1 to 1.5% of at least one heat stabilizer selected from the group consisting of a compound of mono- or divalent copper, a copper compound in combination with a metal halide, a stabilizer based on a secondary aromatic amine, a stabilizer based on a sterically hindered phenol, and mixtures thereof, and 0 to 15% by weight of other additives, selected from the group consisting of a mold-release agent selected from the group consisting of calcium montanate, stearic acid, behenic acid, stearyl alcohol, an alkyl stearate, a stearamide, and an ester of pentaerythritol with a long-chain fatty acid, and a pigment, an impact modifier, a nucleating agent, and mixtures thereof, comprising as mineral filler C) a mixture of from 53 to 65% by weight of C1 with from 7 to 12% by weight of C2 and from 25 to 35% by weight of C3, based on 100% of C, in which component C) has 3 to 8% by weight Al content and 38 to 45% by weight Si content, based on 100% of C) and where the total of the percentages by weight of A) to F) is 100%.

* * * * *